US006732683B2

United States Patent
Weiss

(10) Patent No.: US 6,732,683 B2
(45) Date of Patent: May 11, 2004

(54) CRANKSHAFT FOR A RECIPROCATING INTERNAL COMBUSTION ENGINE

(75) Inventor: Edwin Weiss, Gummersbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 10/117,597

(22) Filed: Apr. 5, 2002

(65) Prior Publication Data

US 2003/0150409 A9 Aug. 14, 2003

(30) Foreign Application Priority Data

Apr. 7, 2001 (EP) .............................. 01108781

(51) Int. Cl.[7] ............................... F02B 75/04
(52) U.S. Cl. .................... 123/48 B; 123/78 E
(58) Field of Search ............... 123/197.4, 48 B, 123/78 F, 48 R, 78 E

(56) References Cited

U.S. PATENT DOCUMENTS

| 3,861,239 | A | * | 1/1975 | McWhorter | 123/78 F |
|---|---|---|---|---|---|
| 4,152,955 | A | * | 5/1979 | McWhorter | 123/78 F |
| 4,887,560 | A | * | 12/1989 | Heniges | 123/78 F |
| 5,146,879 | A | * | 9/1992 | Kume et al. | 123/48 B |
| 5,178,038 | A | * | 1/1993 | Heniges | 123/78 F |
| 5,406,911 | A | * | 4/1995 | Hefley | 123/48 B |
| 5,562,068 | A | * | 10/1996 | Sugimoto et al. | 123/48 B |
| 5,927,236 | A | * | 7/1999 | Gonzalez | 123/78 F |
| 5,960,750 | A | * | 10/1999 | Kreuter | 123/48 B |
| 6,247,430 | B1 | * | 6/2001 | Yapici | 123/78 F |
| 6,276,314 | B1 | * | 8/2001 | Yapici | 123/78 F |

FOREIGN PATENT DOCUMENTS

DE 19703948 C1 6/1998

* cited by examiner

Primary Examiner—Willis R. Wolfe

(57) ABSTRACT

The invention relates to a crankshaft (1) for a reciprocating internal combustion engine, in which the connecting rods are mounted, with an eccentric sleeve (4) connected in between, on the crankshaft journal (3) of a crankshaft (1). A rotation of the eccentric sleeve (4) with respect to the crankshaft journal (3) therefore leads to a change in the effective length of the connecting rod. The rotation of the sleeve (4) is brought about via an electric or hydraulic motor (7) which drives a worm (6) which engages in an outer toothing (5) of the sleeve (4). By means of the active drive, rotation of the sleeve (4) is ensured even if the auto-rotation is impaired due to the occurrence of wear. Furthermore, a self-locking design of the worm gear has the effect of the sleeve (4) being retained in its set position when the drive (7) is switched off.

3 Claims, 1 Drawing Sheet

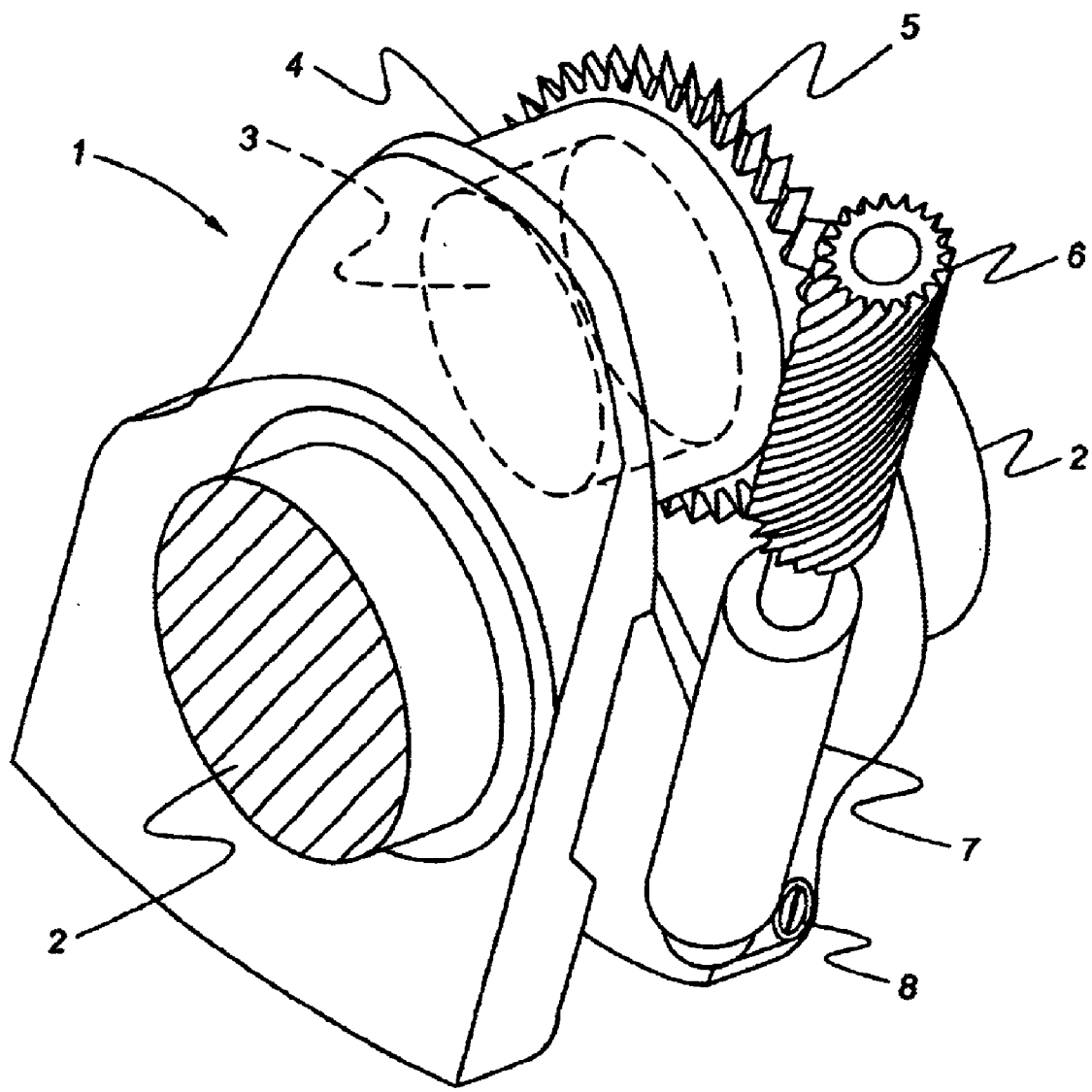

CRANKSHAFT FOR A RECIPROCATING INTERNAL COMBUSTION ENGINE

The invention relates to a crankshaft for a reciprocating internal combustion engine, containing a crankshaft journal and an eccentric sleeve which is mounted rotatably by means of its cylindrical inner surface on the crankshaft journal.

A crankshaft of the type mentioned at the beginning is disclosed in DE 197 03 948 C1. A crankshaft of this type serves to change the compression of a reciprocating internal combustion engine by the fact that the effective length of the connecting rod is shortened or extended, as described below.

A connecting rod is fastened in a known manner by means of its first end in an articulated manner on the piston which moves up and down in the cylinder of the engine. The connecting rod is fastened by means of its second end in an articulated manner to the crankshaft journal of the crankshaft. The linear up and down movement of the piston is converted via the connecting rod into a continuous rotational movement of the crankshaft. According to DE 197 03 948 C1, the connecting rod in this case is mounted by means of its second end on the crankshaft journal via an eccentric sleeve connected in between. The eccentric sleeve has a cylindrical inner surface and a cylindrical outer surface which is eccentric with respect to the inner surface. Depending in each case on the rotation of this eccentric sleeve relative to the crankshaft journal and to the connecting rod, a different effective length results for the connecting rod, which can be defined as the distance between the axis of rotation of the connecting rod on the piston and the axis of rotation of the connecting rod on the crankshaft journal. By means of a rotation of the eccentric sleeve, the compression occurring during the displacement of the engine piston, and therefore the engine performance, can thus be changed.

One of the drawbacks of the known arrangement is that the automatic rotation of the sleeve may cease to happen over a relatively long period of operation of the reciprocating internal combustion engine due to inevitably occurring abrasion. In this case, the correct functioning of the change in length of the connecting rod is no longer ensured.

JP 57040 discloses another mechanism for changing the effective length of a connecting rod. In the case of this mechanism, the bearing journals of a crankshaft are mounted on the vehicle bodywork via eccentric sleeves connected in between. The sleeves can be rotated via an electric drive, with the result that the axial position of the crankshaft, and therefore the effective length of each connecting rod situated thereon, changes. A drawback of this arrangement is that the change in position of the entire crankshaft requires complicated adaptations in the preceding and subsequent power train. Furthermore, all of the bearings of the crankshaft have to be rotated synchronously so that the axis of the crankshaft does not become tilted. A further drawback resides in the fact that the change in length can only be undertaken for all of the connecting rods of the engine simultaneously.

Against this background, it was the object of the present invention to improve a crankshaft of the type mentioned at the beginning in such a manner that it is set up in a simple manner for reliable operation of the engine in the long term.

This object is achieved by a crankshaft having the features of claim 1. Advantageous refinements are contained in the subclaims.

Accordingly, the crankshaft for a reciprocating internal combustion engine contains at least one crankshaft journal which is arranged in a customary manner eccentrically with respect to the axis of rotation of the crankshaft. Furthermore, the crankshaft contains an eccentric sleeve which is mounted rotatably by means of its cylindrical inner surface on the crankshaft journal and the cylindrical outer surface of which lies eccentrically with respect to the inner surface. The one end of a connecting rod can be mounted on the outer surface of the sleeve, a rotation of the sleeve about the crankshaft journal enabling the effective length of the connecting rod to be changed on account of the eccentricity of the sleeve. The crankshaft is defined in that the sleeve is in engagement with a drive means in such a manner that it rotates relative to the crankshaft journal only when the drive means is activated. In this case, the drive means is preferably fastened to the crankshaft, so that it rotates together with the latter.

By connecting the sleeve to an active drive means it can be ensured that even at an advanced age of the engine and with the wear which occurs in this case, the sleeve is still moved in the desired manner in order to bring about the required changes in length of the connecting rod. Since the drive means rotates only when activated, it ensures at the same time that the sleeve is retained in the desired positions when it is rotated about the crankshaft journal, said positions corresponding as a rule to the minimum or maximum effective length of the connecting rod. In contrast, without activation the drive means is at a standstill and then also fixes the sleeve in its current position.

According to a preferred refinement, the drive means can be formed by a motor which drives a worm, the worm engaging in a toothing formed on the sleeve. In this arrangement, the motor can set the worm into a rotational movement about its longitudinal axis, said movement in turn being converted via the toothing of the sleeve into a rotational movement of the sleeve.

The gear mechanism comprising the toothing of the sleeve and the worm is preferably designed to be self-locking. This means that without an active rotation of the worm by the motor no relative movement takes place between the toothing and the worm. In particular, torques acting on the sleeve cannot lead to a rotation of the sleeve, since they are not capable of causing the rotation of the worm needed for this. Such a self-locking design of the gear mechanism has the advantage that it remains functional even if the active drive systems fail and securely retains the sleeve in its set position.

According to a development of the invention, the drive means can be designed hydraulically. This means that the necessary kinetic energy is provided via a pressurized hydraulic medium, such as a hydraulic oil.

The supply of the hydraulic medium to a hydraulically operated drive means can take place in particular via separate feed channels which can be formed within the crankshaft. However, the drive means can also be connected to the existing oil supply which is formed within a crankshaft in order to supply the bearings with lubricant. A connection of this type of the drive means to the oil supply of the crankshaft preferably takes place via at least one valve which can be opened and closed in a manner controllable from the outside. In this manner, the drive means can be activated and deactivated externally.

As an alternative and/or in addition, the drive means can also be designed in such a manner that it can be operated electrically. The drive means may, in particular, be an electric motor.

The necessary electric power is supplied to such an electric drive means preferably via lines which run through the crankshaft and are connected to sliding contacts, so that the electric current can be transferred to the rotating crankshaft from a current source connected to the vehicle body.

The invention will be explained below by way of example with the aid of the FIGURE. The single FIGURE shows, perspectively, part of a crankshaft with an eccentric sleeve mounted thereon.

The section of the crankshaft 1 which is illustrated in the figure comprises the region of an individual crankshaft journal 3 which is mounted between two bearing journals 2 eccentrically with respect to the axis A of the crankshaft. In the case of the multi-cylinder internal combustion engine, a crankshaft journal of this type is provided for each cylinder of the engine.

An eccentric sleeve 4 is mounted rotatably on the crankshaft journal 3. The eye of a connecting rod (not illustrated) is mounted in turn on the cylindrical outer surface of the sleeve 4, the connecting rod producing the connection to a piston of the internal combustion engine in a known manner. By means of a rotation of the eccentric sleeve 4 through 180° in the direction of the arrow, the effective length of the connecting rod can be changed between a minimum and a maximum on account of the eccentricity. The main rotational movement between the bearing on the crankshaft and the connecting rod therefore takes place on the outer surface of the eccentric sleeve 4. In contrast, the phase displacement for controlling the compression ratio takes place between the crankshaft journal 3 and the sleeve 4 on the inside of the eccentric sleeve 4.

In the arrangement according to the invention, the rotation of the sleeve 4 is actively brought about by a motor 7 which is fastened to the crankshaft via screw connections 8. The motor 7 drives a worm 6 which, for its part, is in engagement with an outer toothing 5 on the radially protruding edge of the sleeve 4. A rotational movement of the worm 7 therefore leads to a corresponding rotation of the sleeve 4 about its bearing on the crankshaft journal 3 (see arrow).

The step-up ratio between the toothing 5 of the sleeve 4 and the worm 6 is selected in such a manner that the resulting drive is self-locking (in general: the pitch of the helical gearwheel is smaller than the frictional angle on the gearwheel). Torques acting on the sleeve 4 are therefore not able to set the worm 6 into rotation, with the result that the sleeve 4 is retained in its currently set position when the motor 7 is not being driven. If the active drive system should therefore suddenly fail, the arrangement of the crankshaft 1 automatically remains in its set position, which ensures further operation of the internal combustion engine.

When the bearing surfaces and the corresponding geometries of the sleeve 4 and the crankshaft 1 and the connecting rod are configured correctly, the prevailing power ratios mean that the rotation of the sleeve 4 relative to the crankshaft journal 3 takes place automatically in a manner desirable for the combustion performance. An active intervention in this system is essentially only necessary in order to retain certain positions of the sleeve 4. In the example illustrated, such retention is achieved, as has already been explained above, by the worm gear.

However, the physical and geometrical conditions for an independent and free rotation of the sleeve 4 can, as a rule, be guaranteed in a newly produced crankshaft only for a limited period of time. If, in contrast, the vehicle has reached a longer working life, the free rotatability generally decreases noticeably due to unavoidable wear occurring. In this case, the active drive, by means of the worm gear together with the motor 7 and the worm 6, also continues to guarantee a correct rotation of the sleeve 4 in accordance with the desired compression ratios to be set for the internal combustion engine. In this case, in order to produce a rotation of the sleeve, the system comprising the motor 7, worm 6 and toothing 5 typically has to ensure a torque of approximately 2–4 Nm between the inner and outer diameters of the sleeve 4.

The drive 7 for the worm 6 can be designed as an electric or hydraulic drive. In the case of an electric motor 7, a cable for the current supply is laid in the crankshaft 1, while the connection to ground is led away centrally via a sliding journal.

For a hydraulic motor, a second oil line can be used in the crankshaft 1, which line can be appropriately drilled in or produced during casting. Via an additional line of this type the hydraulic motor can then be activated and driven separately. As an alternative, the hydraulic motor can also be connected to the same oil supply system as the bearings along the crankshaft. In this case, the hydraulic motor is switched by a spherical spring valve in the crankshaft by the rising and dropping oil pressure which is controlled by an oil pump having variable oil pressure.

What is claimed is:

1. A crankshaft for an internal combustion engine, comprising:

a crankshaft journal;

a sleeve having an inner surface disposed about said crankshaft journal and an outer surface eccentric with respect to said inner surface, said outer surface configured to be coupled to a connecting rod; and, an electrically actuated drive means coupled to said sleeve to rotate said sleeve about said crankshaft journal to adjust an effective length of said connecting rod, with said drive means being mounted upon said crankshaft, and with said drive means having electrical lines connecting to sliding contacts arranged in said crankshaft to supply electric power to said drive means.

2. The crankshaft of claim 1 wherein said drive means further comprises a motor operably coupled to a worm gear, said worm gear being further operably coupled to a toothed wheel integral with said sleeve, said motor driving said worm gear to cause said toothed wheel to rotate said sleeve.

3. The crankshaft of claim 2 wherein said worm gear and said toothed wheel are configured to be self-locking.

* * * * *